United States Patent
Lafuente Alvarez et al.

(10) Patent No.: US 9,842,140 B2
(45) Date of Patent: Dec. 12, 2017

(54) DYNAMIC INPUT STREAMS HANDLING IN DSMS

(75) Inventors: Luis Maria Lafuente Alvarez, Madrid (ES); Miguel Angel Pallares Lopez, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 384 days.

(21) Appl. No.: 14/409,599

(22) PCT Filed: Jun. 26, 2012

(86) PCT No.: PCT/EP2012/062318
§ 371 (c)(1),
(2), (4) Date: Dec. 19, 2014

(87) PCT Pub. No.: WO2014/000771
PCT Pub. Date: Jan. 3, 2014

(65) Prior Publication Data
US 2015/0370858 A1    Dec. 24, 2015

(51) Int. Cl.
*G06F 17/30* (2006.01)
*H04L 29/06* (2006.01)

(52) U.S. Cl.
CPC .. *G06F 17/30516* (2013.01); *G06F 17/30292* (2013.01); *G06F 17/30392* (2013.01); *G06F 17/30595* (2013.01); *G06F 17/30864* (2013.01); *H04L 65/60* (2013.01)

(58) Field of Classification Search
CPC .............................................. G06F 17/30516
See application file for complete search history.

(56) References Cited

U.S. PATENT DOCUMENTS

| | | |
|---|---|---|
| 2009/0100029 A1 | 4/2009 | Jain et al. |
| 2010/0030896 A1 | 2/2010 | Chandramouli et al. |
| 2010/0250572 A1* | 9/2010 | Chen ................... G06F 17/3051 707/759 |
| 2011/0016160 A1 | 1/2011 | Zhang et al. |
| 2013/0166712 A1* | 6/2013 | Chandramouli ........ G06F 9/505 709/223 |

OTHER PUBLICATIONS

International Search Report and Written Opinion dated Oct. 4, 2012 for International Application No. PCT/EP2012/062318, International Filing Date Jun. 26, 2012 consisting of 8-pages.
A-Stream_Data_Processing_—_A_Quality_of_Service_Perspective, Springer 2009, consisting of 340-pages.

* cited by examiner

*Primary Examiner* — Grace Park
(74) *Attorney, Agent, or Firm* — Christopher & Weisberg, P.A.

(57) ABSTRACT

A method for providing an output data stream in a network system comprises receiving a request for a desired output data stream and identifying at least one input data stream on the basis of the desired output data stream. The method further comprises identifying at least one relationship between the at least one identified input data stream and the desired output data stream, determining at least one operator on the basis of the at least one identified relationship and creating a query for generating an output data stream corresponding to the desired output data stream. The query is created by applying the at least one operator to the at least one identified input data stream.

19 Claims, 3 Drawing Sheets

DYNAMIC INPUT STREAMS HANDLING IN DSMS

TECHNICAL FIELD

The present invention relates to a method for creating a query in order to provide an output data stream in response to a received request. More specifically, the present invention relates to the identification of an input data stream and the determination and application of an operator to the input data stream for generating the output data stream. The present invention also relates to a respective processing entity, a method of operating the processing entity, a computer program and a computer readable medium

BACKGROUND

Data Stream Management Systems (DSMS) address some of the main problems faced by data intensive applications. Examples of these applications, which require a fast analysis of a huge number of data coming simultaneously from different data sources, comprise applications having to take decisions based on measured figures (e.g. temperature, humidity, etc.) taken by remote sensing devices; wherein e.g. the application decides that an alarm is to be issued depending on a combination of values received from different sensing devices; or applications processing data reported from network nodes, such as telecommunication network nodes (e.g. events related to services related to their users); wherein a further management measured figure with respect to nodes of said network can be taken as dependent on the reported data.

In particular, the DSMS technology allows processing, in a real-time manner, by a DSMS server a plurality of input data coming continuously from a plurality of data sources, so that the DSMS server further produces output data resulting of executing by the DSMS server logical operations (e.g. filter operations, join operations, etc.) on the input data received from the data sources. The resulting output data produced by the DSMS are sent—also in a real time/continuous manner—to one or more servers implementing applications of the kind recited above. Accordingly, a DSMS server dispenses a further application server implementing a certain application service with the need of processing in a real-time manner data coming from a plurality of sources, so that said further application server only receives information—via the DSMS server—upon certain conditions (i.e. as determined by the logical operations performed by the DSMS).

According to "Stream Data Processing: a Quality of Service Perspective" (Springer, ISBN: 978-0-387-71002-0; e-ISBN: 978-0-387-71003-7; Ref [1]), the task of defining a query to be provisioned within a DSMS by skilled person (e.g. a system administrator) requires said person to be familiar with details about the data sources that send input data streams to said DSMS, as well as to be familiar with the nature of the data conveyed by each of said input data streams. Furthermore, in case of the streams to be produced by said CQ needs to fulfill some kind of QoS (e.g. in terms of precision, latency, etc.), said person is also required—at least—to be acquainted about the reporting configuration of the data sources, and—eventually—being also required to modify the reporting configuration of one or more of the data sources whose input data streams are involved in the execution of a CQ.

Traditional relational database management systems (DBMSs), consisting of a set of persistent relations, a set of well-defined operations, and highly optimized query processing and transaction management components, have been subject to intense research and are used for a wide range of applications.

Typically, data processed by a DBMS is not very frequently updated, and a snapshot of the database is used for processing queries.

FIG. 1A serves to illustrate the DBMS paradigm. A storage 100 receives updates 91 and queries 92 and outputs processed queries 93. Updates are not very frequent and DBMS queries are executed once over a snapshot of the database In recent years, another class of data intensive applications has emerged, such as sensor data processing, network management in telecommunications networks and stock trading that need to process data at a high input-rate. These applications need to process data continuously over long periods of time and the data is typically received in the form of a data stream. As a result, the amount of data to be processed can be unlimited. At the same time, these applications need processing capabilities for continuously computing and aggregating incoming data for identifying changes or patterns in a timely manner.

These applications are different from traditional DBMS applications with respect to data arrival rates, update frequency, processing requirements, Quality of Service (QoS) needs, and notification support. Queries that are processed by a traditional DBMS are (typically) specified, optimized, and evaluated once over a snapshot of a database ("DBMS queries").

In contrast, queries in a stream processing environment are specified once and evaluated repeatedly against new data over a specified life span or as long as there exists data in the stream. They are long-running queries that produce output continuously. The result is also assumed to be a stream, possibly with differing rates and schema (as compared to the input). These queries are termed "continuous queries" (CQs). FIG. 1B serves to illustrate the DSMS paradigm. A storage 100 receives incoming data 91' of real time feeds 94. Queries 92' for particular output data streams are received and output data streams 93' are provided. Queries executed in DSMS are termed continuous queries since they are continuously executed over new incoming data.

Although traditional DBMSs might be used in stream processing scenarios, the procedure would then require the steps of loading the incoming data streams into persistent relations executing the same DBMS queries over these relations repeatedly. The main problem with this approach is that the storage of stream data, indexing (as needed) and querying will add considerable delay (or latency) in the response time that may not be acceptable to many stream applications.

The requirement that data needs to be persisted on secondary storage device (that has high latency) before it can be accessed and processed by a DBMS in main memory (that has low latency) is at the core of this mismatch. In addition, the "snapshot" approach for evaluating stream data may not always be appropriate as the values over an interval might be important (e.g., temperature changes) for stream processing applications. Furthermore, the inability to specify quality of service requirements (such as latency or response time) in most of traditional DBMS makes its usage less acceptable for stream applications.

Hence, the techniques developed for DBMSs need to be re-examined to meet the requirements of applications that use stream data. This re-examination has given rise to a paradigm shift along with new approaches and extensions to current techniques for query modeling, optimization, and data processing to meet the requirements of an increasing number of stream-based applications. Systems that have been developed to process data streams to meet the needs of stream based applications are termed Data Stream Management Systems (DSMSs) in the literature.

As opposed to a traditional Database Management System (DBMS), a DSMS is not reactive in the sense that it executes a query only if a request is received from another server and over a "snapshot" of the data it stores. Rather, a DSMS can be active in the sense that it executes queries (i.e. the so called "continuous queries", CQ) in a continuous manner on data contents of a set of input data streams that it continuously receives, and produces, as a result, a set of output data streams which are sent from the DSMS to one or more further servers. The latter sending of the output data streams can also be effected in a continuous manner.

Whenever a new continuous query (CQ) is entered into a DSMS system a query plan must be generated (in a similar way as traditional DBMSs actually do), although in some DSMS systems the query language is specified at such a low level that it might be directly handled as a query plan by itself.

A query plan could be understood as a sequence of basic (pre-defined) operators yielding the expected query result. For example, when a SQL query is sent to a traditional data base (i.e. a database managed by a DBMS), the DBMS, after parsing the query, generates this sequence of basic operators implementing the query logic. The nature of these operators depends on the specific vendor.

In a DSMS the kind of basic operators in which a query is decomposed can comprise "stateless" as well as "stateful" query operators. Generally, "stateless" operators do not impose any special requirement to data streams, since their logic can be executed in a rather straight forward way. One case of a "stateless" operator can comprise an operator implementing a "filter"; for example, data whose value exceeds a predetermined value would go through, whilst data not reaching the value would be discarded.

However "stateful" operators involve some internal storage in order to come up with a final result. As data streams are unbounded in nature, stateful operators should work only upon a finite subset of the data stream. One example would be an operator implementing the average value of the previously received data (e.g.: in a certain interval, once a certain number of data have been received, etc.). If the final value to be produced by a "stateful" operator had to take the whole data stream into consideration, the result would (likely) never be produced.

It is thus necessary to specify by the CQ the subset of data for which the average value is to be calculated. This subset is called a "window" and it is—normally—specified as a function of time (e.g. 3 seconds), or as a function of the number of received data items (e.g. 40 data in a row). In this way, a result is continuously produced. Multiple queries can be executed at the same time within the DSMS, and each single query plan can share operators—or even part of its query plan—with other queries. Moreover, more than one application can be registered to the same query and more than one input stream can be part of the same query.

As an illustrating example, FIG. 2 shows (in a simplified manner) two CQs being executed in the same DSMS. In the example, the DSMS receives data via two input data streams (referenced with 901 and 902, respectively), and produces two output data streams towards different destinations outside the DSMS (illustrated as a first server implementing a first application 31, and a second server implementing a second application 32). In FIG. 2 Op1 to Op8 stand for query operators, wherein the query operators linked by the continuous lines execute a first CQ (i.e. implement the query plan of said first CQ), and wherein the query operators linked by the broken lines execute a second CQ.

A query operator can implement different operations, such as a "filter" based on received values from input data streams (e.g. only certain data matching a certain value, or exceeding/below a given threshold, are further processed), and/or a "join" of values received from one or more input data streams (e.g. only certain data coming from a first data stream are considered for further processing depending on certain matching values received from a second data stream).

For the sake of illustration, stream 901 could be received e.g. from a first telecommunications node providing a location registration service (such as a "Home Subscriber Server", HSS) which sends towards the DSMS a data stream containing information about registration events of user from their terminals (e.g. the data stream comprising data identifying a user, identifying the roaming access network to which a user currently attaches, whether a user registers or deregisters, etc.), and stream 902 could be received e.g. from a second telecommunications node providing multimedia communications services to a plurality of users (such as a "Proxy-Call Session Control Function", P-CSCF) which sends towards the DSMS information about communication service events related to said users (e.g. identifying the user, session initiation/termination events, the kind of communication service established, etc.).

Input streams constitute a key element in every query plan since they provide the raw data that should be further processed in the query execution. According to the conventional arts, every query registered into a DSMS needs to explicitly indicate the one or more input data stream(s) for which the corresponding data should be extracted and analyzed, as well as the specific criteria to build up the corresponding query plan.

As a result, the query plan derived from a CQ executed by a DSMS contains operators whose main task consists of extracting the data coming from the input streams. In a next step, these data are sent out to the corresponding operators implementing the query logic. As an example, operators Op1 and Op6 in FIG. 2 extract the data coming from input stream 901 and 902 and send them out to operators Op2/Op4 and Op8, respectively.

Input data streams are fed into a DSMS coming from a single data source, or coming from a plurality of data sources. Examples of data sources comprise, a sensor sending a certain measured data (e.g. related to a current condition, such as a measured temperature, a measured geographical position, etc.), or a telecommunications node sending information about service usage by a certain user (e.g. by means of the so called "call detailed records", CDRs).

Data sources might support different event reporting configurations. Each configuration is normally tied to a different event reporting granularity. For example, a telecommunications node can be configured in such a way that only one specific type of multimedia sessions is reported towards the DSMS. But it would also be possible to configure said node in order to send more detailed information, covering e.g. other multimedia session types as well as lower level information of said sessions, and/or to report information about other kind of events.

In any case, the way on which reporting configurations are configured in a data source (i.e. the quantity and/or frequency of data said data source has to send data towards a DSMS) can impact seriously the performance of said data source, mainly in the case where said data reporting task is not the main task that is to be performed by said data source. For example, the main task of a node implementing a HSS functionality in a telecommunications network is to reply in very short time to messages coming from other nodes in said system, which request to store location information of a terminal registered for a user, and/or which request to answer with said location information when a service is requested towards said user. Accordingly, the performance of the basic functionalities which are to be performed by the HSS node can be harmed by its duty to report events to a DSMS (e.g. events related to user registration, location, terminating services, etc.).

Conventionally, whenever a person (such as a system administrator) registers within a DSMS a continuous query (referred also hereinafter as a "business query"), he/she must clearly specify the corresponding input streams that are received by the DSMS that convey the data on which said query has to operate. However this might result in several drawbacks:

First of all, this kind of approach requires the person (e.g. a system administrator) that defines the business queries that is/are to be registered within the DSMS (so as to be executed therein as CQ/s) to be familiar with all the data sources that send input data streams to said DSMS, as well as with the nature of the data conveyed by each of said input data streams.

In case one or more of the data source/s involved for a CQ become unavailable (because, e.g., it crashes, or it is overloaded by its main duties) the CQ will likely fail to produce any result (at least with a "good enough" QoS). This kind of downfall events can barely be predicted by the person that manually configures business queries in the form of CQs into a DSMS.

Last but not least, data sources might have different reporting configurations (e.g., event data models, notification frequency, etc.). Modifying the reporting configuration in a certain data source (such as a telecommunications node assigned to perform a certain main functionality in addition to said data reporting) can impact its performance in a way that might not be easily assessed in advance by the person that provisions CQs in the DSMS.

For example, in the case of a data source being a telecommunications node performing a specific function within a telecommunications system, said impact can depend e.g. on the traffic actually handled by said node performing its basic duties with respect to said telecommunications system. For example, if the processing and/or communication resources of said node are almost overloaded for accomplishing with its basic duties, then no room for event reporting activities towards a DSMS would be available within the node for reporting tasks. However, after some time, the node might have sufficient resources for event reporting tasks. That is, for the same business query (CQ), the optimal implementation can change over time with respect to the data sources that provide the data for said query, and their respective data reporting configurations.

Moreover, a CQ to be provisioned in a DSMS can specify QoS requirements for executing said CQ within the DSMS. In short, QoS specified for a CQ is usually related to the particular needs of the specific application hosted by the server that will be the destination of the subsequently produced output data streams. The QoS specified for a CQ can comprise metric values indicative of, e.g., frequency or delay for the data conveyed by the corresponding output stream (for example, if said data can be sent in a bursty manner, or sent on a regularly basis), e.g. a value indicative of an accuracy on said data (for example, in terms of error tolerance which can be useful in case the CQ involves "stateful operators" and, thus, "execution windows"), etc.

The task of defining a CQ to be provisioned within a DSMS by a system administrator may thus require that he/she is familiar with details about the data sources that send input data streams to said DSMS, as well as familiar with the nature of the data conveyed by each of said input data streams. Furthermore, in case of the streams to be produced by said CQ needs to fulfill some kind of QoS (e.g. in terms of precision, latency, etc.), said person is also required to be acquainted about the reporting configuration of the data sources, and being also required to modify the reporting configuration of one or more of the data sources whose input data streams are involved in the execution of a CQ.

However, whilst this kind of—let's say—manually based solutions can be assumed to work well for a simple data reporting scenario comprising just a few of data sources with well-defined data reporting schemas, such a kind of solutions cannot scale well when coming to face more complex scenarios; for example scenarios comprising a plurality of data sources (which can be a significant number of data sources), as well as a plurality of eventual applications (which can be a significant number of applications) that might require to collect data—according to criteria that can even vary frequently—from a plurality of data sources, which number and/or nature that can also vary.

SUMMARY

It is thus an object of the present invention to provide a substantial improvement to the known systems that handle stream requests and corresponding queries. This object is achieved by the subject-matter of the independent claims. Preferred embodiments are described in the dependent claims.

According to an embodiment of the invention, a method for providing an output data stream in a network system is provided. The method comprises receiving a request for a desired output data stream and identifying at least one input data stream on the basis of the desired output data stream. The method further comprises identifying at least one relationship between the at least one identified input data stream and the desired output data stream, determining at least one operator on the basis of the at least one identified relationship and creating a query for generating an output data stream corresponding to the desired output data stream. The query is created by applying the at least one operator to the at least one identified input data stream.

According to further embodiments, a respective processing entity, a method of operating the processing entity, a computer program and a computer readable medium are provided.

BRIEF DESCRIPTION OF THE DRAWINGS

Embodiments of the present invention, which are presented for better understanding the inventive concepts but which are not to be seen as limiting the invention, will now be described with reference to the Figures, in which.

DETAILED DESCRIPTION

Figure 1A:
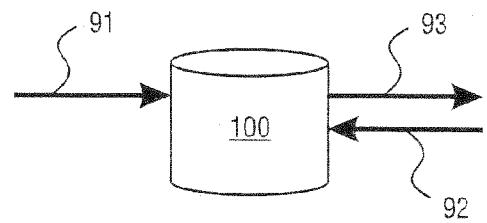
FIG. 1A serves to illustrate the DBMS paradigm,
FIG. 1B serves to illustrate the DSMS paradigm.
Figure 1B:
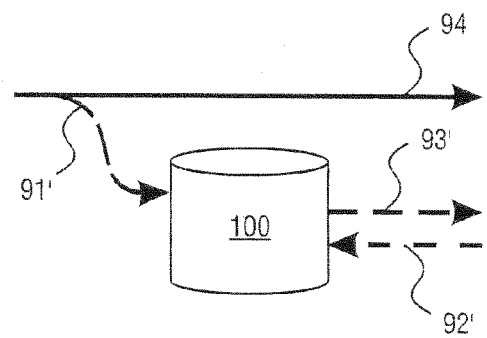
Figure 2:
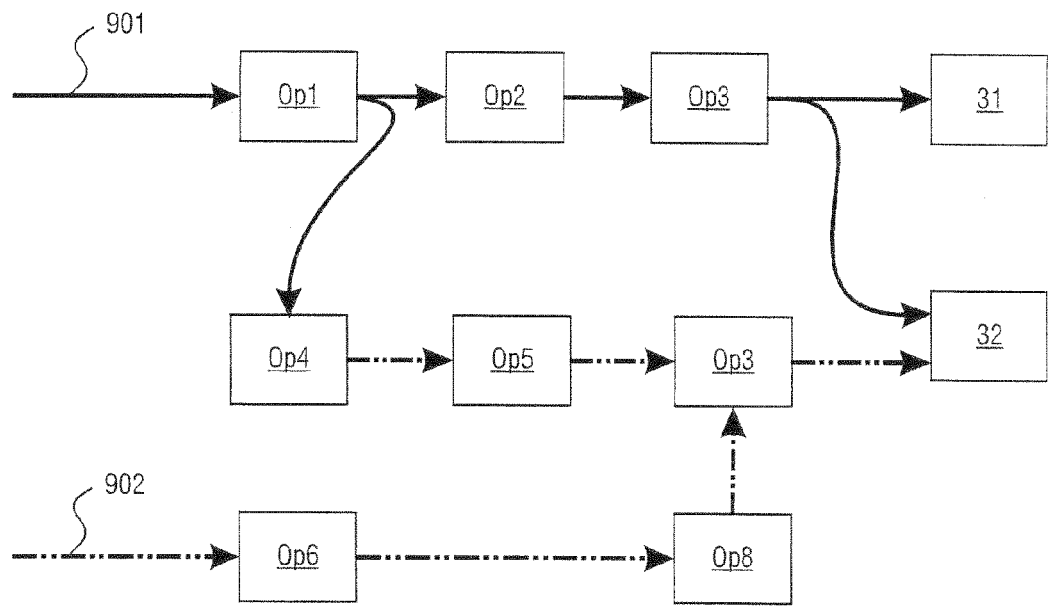
FIG. 2 shows an example of two continuous queries running in the same DSMS.
Figure 3:
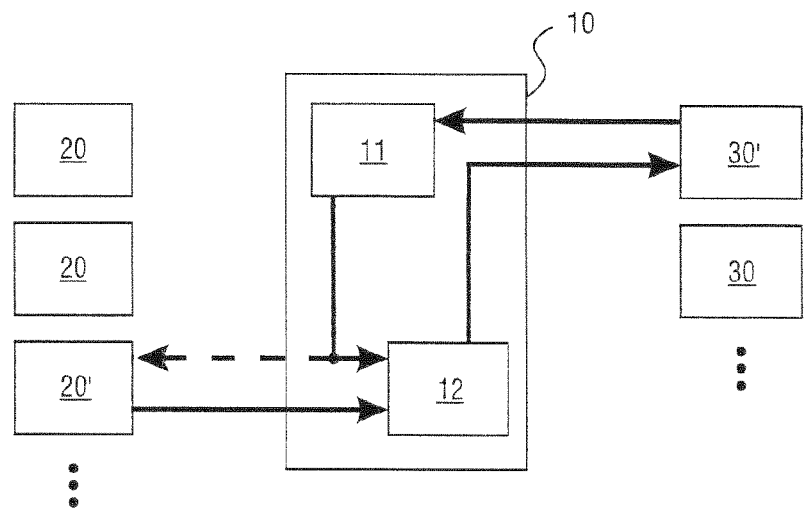
FIG. 3 shows a schematic representation of a processing entity involved in the reception of an input data stream and the provision of an output data stream according to an embodiment of the invention.

FIG. 3 shows a processing entity 10 in accordance with an embodiment of the present invention. The processing entity 10 is provided in a network system and communicates with data sources 20 and client devices 30. The processing entity 10 receives from the data sources one or more input data streams. Although not shown in FIG. 3, a data source may provide more than one input data stream and the processing entity may receive a plurality of input data streams from a plurality of data sources. The processing entity is configured create and execute a query by applying one or more operators to one or more of the received input data streams in order to provide an output data stream.

The processing entity 10 is configured to receive requests for a desired output data stream from one of the client devices. This request may indicate a particular type of data the client device is interested in, but, thanks to features provided by the present invention, may do so without specifically indicating a particular input data stream, data source or operator (query operator) to be applied to data from an input data stream. That is, the desired output data stream may be expressed in a generic way, thereby simplifying the task of providing a CQ within a DSMS that then can be subsequently executed therein.

The required capabilities for identifying a suitable input data stream, data source and corresponding operators (query operators) are thus realized in the processing entity 10. That is, the processing entity 10 is configured to identify, on the basis of the desired output data stream as specified in the received request, at least one input data stream. According to further embodiments, the processing entity may do so by referring to a stored mapping (also denoted "stored mapping relationship") and a stored data schema. It is noted in this regard that, in order to provide an output data stream corresponding to the desired output data stream, more than one input data stream may be used. That is, the query created by the processing unit may generate the output data stream as a function of a plurality of input data streams.

In addition to identifying at least one input data stream, the processing entity 10 also identifies a relationship between the one or more identified input data streams and the desired output data stream. That is, the processing entity identifies, how the one or more identified input data streams are related to the desired output data stream. This relationship may e.g. consist of a mathematical function—the desired output data stream may e.g. correspond to a fraction of a particular input data stream or to the sum of two input data streams. The relationship may also consist of any other data processing function.

In any case, it can be the processing entity itself that identifies this relationship. According to further embodiments, it may do so by referring to a stored mapping and a stored data schema.

The processing entity is further configured to determine at least one operator on the basis of the at least one identified relationship and to create a query for generating an output data stream corresponding to the desired output data stream by applying the at least one operator to the at least one identified input data stream. It is noted in this regard that, while the generated output data stream corresponds to the desired output data stream, it may be possible that it is not completely identical to it. This is due to the fact that the request does not have to precisely specify the input data stream, operator or data source to be used, and due to the fact that the processing entity is given a certain degree of freedom in creating the query. As will be described in detail below, it may e.g. be the case that the output data stream corresponds to the desired output data stream with a certain accuracy.

As mentioned above, in accordance with a further embodiment of the present invention, the identification of the input data stream may be performed with reference to a stored mapping and a stored data schema, such as a low level data schema. The data schema may list the types of data provided by the input data streams and indicate dependencies between the types of data. The data schema may further associate the types of data with input data streams provided by respective data sources. The stored mapping may serve to relate data information, contained in the received request and indicating the desired output data stream, with one or more types of data of the data schema.

As such, in accordance with a further embodiment, the processing entity is configured to identify the at least one input data stream by determining one or more data identified by the stored data schema based on the data information received in the request and based on the stored mapping. In this regard, the request may specify the desired output data stream in accordance with a high level data model, as e.g. the data model for business described below in conjunction with FIG. 5. In this manner, the stored mapping may relate types of data defined in the high level data model with types of data defined in the stored data schema.

Furthermore, in accordance with a further embodiment of the present invention, the processing entity may be configured to identify the relationship between the at least one input data stream and the desired output data stream by referring to the above described stored mapping and stored data schema. In this regard, the stored mapping may specify the manner in which the desired output data stream relates to one or more of the data types defined in the stored data schema. The stored mapping may e.g. define a function, such as a data processing function, for generating the output data stream corresponding to the desired output data stream on the basis of one or more types of data included in the stored data schema. An exemplary representation of such a stored mapping is shown below as XSLT code.

Additionally, the dependencies defined between types of data in the stored data schema may also be referred to when identifying the relationship between the at least one identified input data stream and the desired output data stream. In one example described in more detail below, the dependencies are hierarchical and/or define a ratio between numeric values of respective data elements of input data streams associated with the different types of data.

It is noted that, in accordance with an embodiment of the invention, both the function defined in the stored mapping as well as one of the dependencies defined in the data schema may be employed for identifying the relationship between the at least one identified input data stream and the desired output data stream. That is, a combination of the function defined in the stored mapping and one of the dependencies defined in the data schema may be used in order to identify the relationship.

According to a further embodiment of the invention, the processing entity may be configured to generate a plurality of different queries in response to a particular request and then select only one of the queries for execution. The queries may e.g. differ from each other in that they employ different input data streams or different operators. It is noted that generated queries that are not being executed at the moment are also referred to as candidate queries or candidate CQs in this application.

The processing entity may further be configured to base the creating and/or selecting of a query on availability information with respect to the availability of an input data stream. The availability information may further indicate the current availability status of a data source. More specific examples in this regard are provided below in the sections on data source availability and data source's data model schema exposure. It is noted that the availability information may be received from the data sources.

In accordance with a further embodiment, the processing entity may further be configured to base the creating and/or selecting of a query on processing resources required by the executing of the query. The processing resources may be the processing resources of an apparatus of the network system being involved in the executing in the query. This apparatus may, e.g., be a Data Stream Management System, DSMS, server, executing the query, or one of the data sources providing an input data stream. These processing resources may e.g. be hardware resources and further examples in this regard are provided below in the section on CQ execution performance assessment.

According to a further embodiment, the processing entity may be configured to select and execute another created query, if an input data stream of an executed query is interrupted. The other created query may be a query providing an output data stream corresponding to the one provided by the executed query. The other created query may further make use of a different input data stream than the one used by the executed query. In this regard, the processing entity may be configured to monitor input data streams and detect an interruption, if an input data stream has ceased to provide data for a predetermined period of time.

In further embodiments of the invention, the identification of the input data stream and the relationship between the input data stream and the desired output data stream may be performed by a request handling module 11 of the processing entity 10. This request handling module 11 can further be adapted to communicate with the data sources in order to e.g. request a particular input data stream. Moreover, the processing entity 10 may comprise a query execution module 12 for executing the created query.

It is noted that the processing entity 10 is also referred to as a "generic reporting system" in this application. Moreover, in further embodiments of the invention the processing entity 10 may be implemented as a Data Stream Management System, DSMS, and the query may be a continuous query for being executed by a Data Stream Management System, DSMS, of the network system, the continuous query comprising a set of one or more operators that apply continuously to data received by the DSMS via one or more input data stream, so as to produce by the DSMS one or more output data streams. Also, in further embodiments of the invention, the client devices are e.g. external servers hosting certain applications, such as business applications and the request for a desired output data stream can be a query, such as a business query, from one of the client devices. It is further noted that a query may comprise a sequence of operators and that this sequence may be denoted "query plan".

According to further embodiments, the present invention provides a solution that comprises the DSMS storing data schema information about the data held by a number of data sources which send input data streams based on their own data to the DSMS. The data schema information is usable by the DSMS to identify a certain data received via an input data stream from a given data source, and its dependencies with other data held by said data source, or by the same or related data held by other data source/s, received via said input data stream or via other input data stream/s.

When the DSMS receives a query ("business query") for generating an output data stream towards an external server hosting a certain ("business") application, the DSMS: [A] determines one or more data identified by said stored data schema based on the data information received in the business query (i.e. specifying the data or—in a generic manner—the kind of data that shall be processed by the DSMS), and [B] generates one or more candidate CQs for being executed by the DSMS based on these one or more determined data. Subsequently a selected candidate CQ is executed by the DSMS for generating and sending the corresponding output data stream towards the external server.

According to one embodiment, the DSMS stores a mapping relationship between a data information that can be received in a business query (i.e. specifying the data or—in a generic manner—the kind of data that shall be processed by the DSMS), and one or more data identified by said stored data schema. The process of determining one or more data identified by said stored data schema based on the data information received in the business query includes checking said stored mapping relationship.

According to a further embodiment, the DSMS further stores availability information in respect to one or more data sources which can send input data streams to the DSMS. The process of selecting a candidate CQ takes into account said availability information.

When coming to define within a DSMS CQs that provide output data streams under a certain logic (i.e. "business query"), the solution of the present invention dispenses with the need of having a detailed knowledge about the number of kind of data sources that can feed input data streams to a DSMS, as well as with the specific nature of the data conveyed by said data streams. Furthermore, the impact in data sources due to data reporting tasks (i.e. reporting data towards a DSMS) can be minimized, since the DSMS can dynamically (and even during the CQ execution) select alternative data sources—which can report the same or equivalent data, and that can be selected based on its current load/availability—for accomplishing with a received business query. Relying upon said equivalent data may involve only a minor determination of service/query quality.

In other words, the DSMS can (re)select a (candidate) CQ—for being executed by the DSMS for accomplishing with a received business query taking into account not only the data sources that provide stream data that can be used for accomplishing with a received business query, but also the current availability status of said data sources. This can comprise, amongst other, considering by the DSMS updated information about load information of a data source in terms of memory and/or CPU resources, degree of availability of communication resources in a data source, number and/or frequency of the data received from a data source, etc. This kind of availability information can be collected by the DSMS with respect to a plurality of data sources in an active manner (e.g. the DSMS establish a communication with a data source and requests data representing figures relating to its availability) or in a passive manner (e.g. the DSMS receive data representing figures relating to source's availability without an explicit request). Both solutions can further coexist.

According to another embodiment of the present invention some extra functionality is added to a DSMS, which comprises providing it with information related to data sources for determining how to implement and/or adapt CQs executed within said DSMS. Since a DSMS fits particularly well in scenarios wherein a server (i.e. such as a DSMS server) is a centralized point in charge of collecting and processing notifications coming from several data sources (e.g. in particular, coming from a plurality of nodes of a telecommunications network), an enhanced DSMS in accordance with an embodiment of the invention will be referred in some places of this application as a "generic reporting system".

Figure 4:
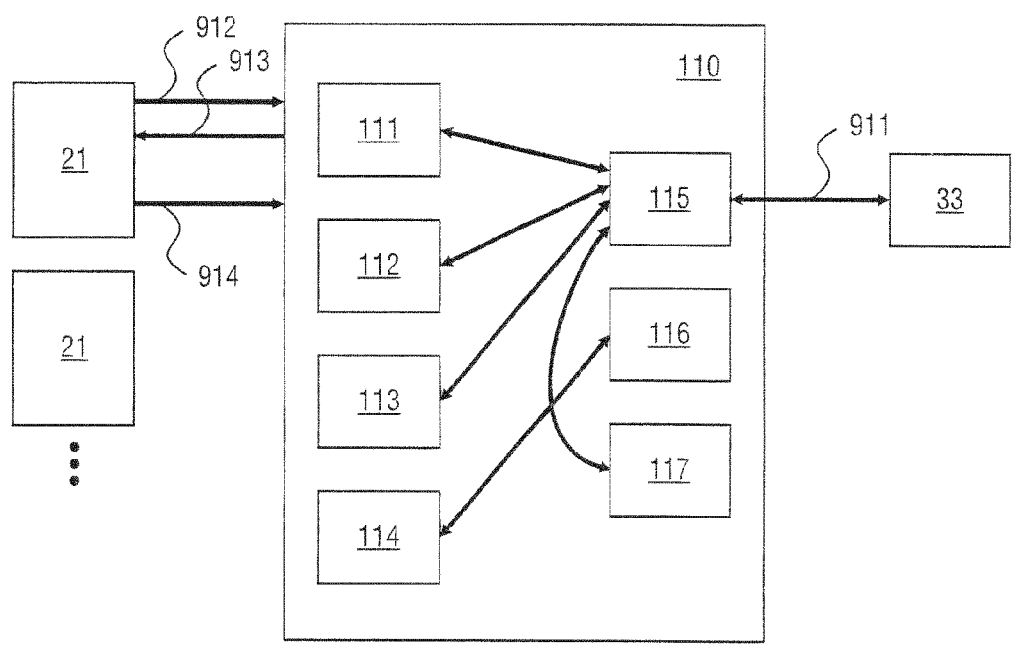
FIG. 4 shows a basic architecture of a processing entity in accordance with the present invention.

As shown in FIG. 4, the generic reporting system 110 is fed with information by a number of data sources 21 (e.g. nodes of a telecommunications network). Every data source hosts its own (set of) reporting data schema(s), and its reporting capabilities usually change over time. Namely, event reporting consumes processing and communication resources in the data source, and can therefore affect the quality of service of said source when performing its— say—main tasks (which is the case of e.g. a node of a telecommunications network).

Therefore, according to a further embodiment of the invention, information about these schemas, and/or information indicative of the current capabilities of a data source (e.g. a figure based on CPU load, memory availability, etc. . . . ) are made available to the generic reporting system. The generic reporting system then uses said information to determine how a CQ is to be executed to produce the corresponding output data streams for serving a received business query. Said information can also be used to modify dynamically a CQ currently executed by the DSMS (e.g. by changing one or more input data streams used by the CQ).

Whenever the network administrator is interested in extracting some information from the network (possibly involving several nodes at the same time), he issues a business query to the generic reporting system. According to embodiments of the invention, this query includes the desired information expressed in a generic way, i.e. not necessarily tied to the specific data schemas that specify the real data models hosted by the concrete network nodes. In other words the query is not tied to the specific nature of the data which are reported by the data sources and which are received in the DSMS in the form of input data streams, nor necessarily identifying specifically a data held by said real models. The business query can also comprise some QoS requirements (e.g. with respect to the precision to be delivered by output data streams that will be subsequently produced by the corresponding CQ/s to be implemented subsequently within the generic reporting system—DSMS).

With the aid of a repository, which stores the overall network data model schema, it is possible to map the information indicated by a business query into the real data as they are exposed by the data sources. Based on this mapping the DSMS derives one or more different possible low-level implementations of the business query, each of them likely using input data streams of different nodes and/or taking into account different event reporting configurations of said nodes. Each possible implementation is referred to as a candidate CQ. In this regard, a derived low-level implementation may correspond to a CQ as actually executed by the DSMS.

Although a business query can refer to a specific data held by a data source (say: a "real" data, later referred as "low-level" data), not every real data used in a candidates CQ is just the direct mapping of the information requested by a received business query. Once the direct mapping is performed, and based on the network data model dependencies, it might be possible to select higher/lower level data instead. This is possible because a process in the DSMS is (e.g. continuously) quantifying these dependencies.

For example, a business query requests a certain data A, which is mapped on to the real data R. In the network data model of a telecom network, which is commonly hierarchical, data R is represented by a leaf, whose parent leaf corresponds to data W. In this case, if it is possible to derive—in a quantitative way—R from W (e.g. suppose that the number of occurrences of R is 30% of the occurrences of W) then it would be possible to accomplish with the business query in the DSMS using data "W" instead of data "R" in the corresponding (candidate) CQ.

Accordingly, an advantage can be provided in that, e.g., if the source of data R is overloaded with other duties than reporting data streams conveying R to the DSMS, or even if the reception of input data streams conveying data R fails, the DSMS can alternatively re-arrange a CQ whose query plan currently includes processing R, so that it instead processes W thereafter. As a consequence, the corresponding output data stream/s whose production implied the use of data R is/are not delayed or interrupted, although the QoS of the data conveyed therein can have so to speak less accuracy (which can be optionally indicated).

In order to come up with the optimal CQ candidate corresponding to a received business query (that is, the CQ/s which is going to be in fact executed in the DSMS), following information can also be taken into account for every CQ candidate: The data source availability for event reporting tasks (i.e. as required for the execution of the candidate CQ); the impact in performance that the candidate execution will have in both, the corresponding data sources and the generic reporting system—DSMS—itself; and/or the QoS requested by the business query (if any).

The candidate CQ optimizing these figures can then be selected and executed in the DSMS.

The aforementioned procedure for generating (and then selecting) one or more candidates CQs for a received business query is dynamic in the sense that the same business query can yield different selected CQ candidates for being executed by the DSMS depending e.g. on the availability of the involved data sources (e.g. nodes of a telecommunications network), which can vary over time, and/or depending on the QoS that might result for the corresponding output data stream/s to be produced by the CQ.

The aforementioned procedure is also dynamic in the sense that, for example, in case a data source stops sending data in a data stream used by the CQ, the DSMS detects this and the query plan of said CQ is automatically re-evaluated again (e.g. data stream/s from another data source which provides the same—or similar—data is selected for restructuring the query plan of said CQ).

As a result, the corresponding query results will be generated in a continuous and real time fashion by the DSMS, which is less prone to be affected by failures and/or congestions in data sources, and said results will thus be sent in a more continuous and reliable manner—in the form of output data streams—from the DSMS to the corresponding external servers that host the applications for which the business queries were registered.

The basic architecture, according to an embodiment of the invention in which the data sources are nodes of a telecommunications network is depicted in FIG. 4. FIG. 4 shows a generic reporting system 110 comprising a node data schema discovery module 111, a node capabilities (real time) module 112, a CQ execution (real time) module 113, an inter-level data correlation (learning module) 114, a business query handling module 115, an overall network data schema storage 116, and a monitoring performance impact (learning module) 117. The generic reporting system 110 communicates with one or more external servers hosting business applications 33 via interface 911, receiving business queries and sending output data streams. The generic reporting system 110 furthermore communicates with one or more network nodes 21, which provide input data streams via the interface 914. The network nodes 21 also publish node availability status and report data schemas via interface 912 and can be requested for a desired reporting data schema via interface 913. In the following, some implementation details of the overall architecture depicted in FIG. 4 shall be provided.

First, data source availability and data source's data model schema exposure is described. The availability of a telecommunications node 21 (e.g. a data source for a DSMS), for example in terms of node resource consumption figures at any time (in terms of e.g. CPU usage, memory availability, etc. . . . ), or in terms of percentage of availability or current load, are preferably fed into the generic reporting system (DSMS) 110. A rather simplified approach is feasible: it is possible to monitor the hardware platform resource usage in the data source (node 21 in the example) by means of a software "agent" which, in turn, forwards it to the DSMS. One example would be a simple program executing the 'top' command in UNIX. Another option would be to make use of the SNMP information (or any other equivalent information) generated by the network node itself.

In this regard, it is generally noted that SNMP allows TCP/IP-based network management clients to use a TCP/IP-based internetwork in order to exchange information about the respective configuration and status of said clients. Examples of these clients are nodes of a telecom network. The information available via SNMP is defined by a set of managed objects referred to as the SNMP Management Information Base (MIB). In these MIBs, telecom nodes store different types of information—such as e.g. the number of executed transactions (e.g. user registrations in HSS), node status information (CPU utilization, memory . . . ), etc.

As a DSMS is at the core of the generic notification system, it is possible to send this information as a new input stream feeding the DSMS, or as a new kind of data within an already input data stream. However any other approach is feasible (e.g. a web service storing this information—inside or outside the data source—and accessed from the DSMS, etc.).

Collecting node availability information would be the task of the node capabilities module 112 depicted in FIG. 4.

Data model schemas defining the data held by a data source (e.g. node 21), wherein some of said data can be sent from the node to the DSMS via one or more input data streams, are also preferably made available to the DSMS. The data schemas supported by a node are usually configured therein via O&M commands, and are usually expressed via one or more configuration files (e.g. using XML), which can express in some cases a data hierarchy (e.g. in the form of a tree). The content of this file/s can be made available to the DSMS using similar mechanisms as described above for the node availability information, or via any other mechanism supporting the transference of data through a network (e.g. via FTP). Collecting information about these data schemas would be the task of the node data schema discovery module 111 depicted in FIG. 4.

The DSMS maintains an association between a certain data belonging to the data schema of a particular data source and the corresponding input data stream via which said data is reported from said data source to the DSMS. Furthermore, since the same or similar data can be received from different data sources having the same or similar data schema, the DSMS can maintain an association between a certain data and the set of input data streams via which said data is reported to the DSMS. For example, the registration/deregistration events of a user of a mobile telecom system can be reported from different HSS nodes (e.g.: via a tuple such as [MSISDN-Usr-x; state=register/unregister]) if e.g. these nodes work in a load sharing or active/back-up manner. Similarly, and as a further example, information about the wind speed/direction can be reported from a plurality of sensors to the DSMS via various input data streams, and the DSMS can then keep an association between different data streams reporting said information from sensors which are located closely; so that, if e.g. a sensor fails to report the measurements in a certain area that are to be used for executing a CQ, data from other sensor located in said area, or near said area, would be used instead in the CQ.

Now, the business query data model will be described. The business query can follow a traditional DSMS query syntax, but the information referred by said query in respect to the data which are to be processed by the DSMS in the form of a CQ can assume a high-level data model/schema that does not necessarily match the low-level data schemas exposed by the data sources in relation to their respective configured data schemas. Furthermore, the business query does not need to specify which input data stream/s the (high-level) data indicated therein relate; thus, dispensing with the need of knowing data sources details when designing a business query.

For example, the administrator wants to know the number of voice calls placed by a predefined set of users (e.g. with MSISDN values ranging from 1000 up to 2000) within a given period of time (e.g. from 20:00 h to 21:00 h). Then the registered business query can be something like:
Select count (*) FROM userdata WHERE msisdn=1000-2000 AND service=voice AND timewindow=20:00-21:00;

However, there are different ways of placing voice calls: over circuit switching or packet switching technologies. Each of them can involve different nodes in the telecom network. The corresponding data structures and mappings are defined in FIG. 5, which shows an example of the relation between the business query data model 80 and the low level data model 70, which depends on the specific data models of the network nodes.

Figure 5:
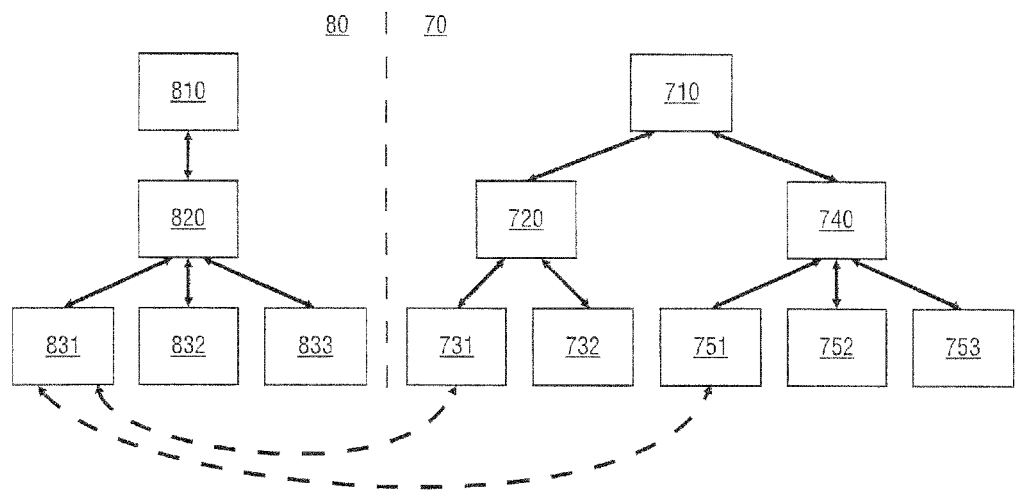
FIG. 5 shows an example of a relation between a business query data model and a low level data model in accordance with the present invention.

The business query data model 80 illustrates relations between different types of data that may be requested by a client device. In FIG. 5, block 810 represents msisdn, block 820 represents services, block 831 represents voice, block 832 represents video and block 833 represents messaging. The low level data model 70 illustrates hierarchical dependencies between different types of data. In this regard, block 710 represents user id, block 720 represents circuit switching, block 740 represents packet switching, block 731 represents voices, block 732 represents SMS, block 751 represents VoIP, block 752 represents video streaming and block 753 represents IPTV.

Each data defined in the low level data model 70 is, moreover, associated with one (or more) specific telecom nodes, from which the data can be fetched (within the corresponding input data stream). In this example, voice information 831 could be retrieved from MSC nodes (i.e. for voice calls using circuit switching technology) and from CSCF nodes (i.e. for voice calls using packet switching technologies, such as Voice over IP, VoIP).

Therefore, a DSMS can receive the business query given in the example above, and dynamically select (and re-select if necessary) data sources among a plurality (i.e. in the example, MSC nodes or CSCF nodes) which can provide information via input data streams for executing CQs that fulfill the requisites of the received business query. Furthermore, the DSMS can be configured with relationship between data that can be received in a business query and further data that can relate to said received data. Following the example of the business query given above, the DSMS can be configured to store the relationship between an identifier of a user (e.g. an MSISDN) and further identifier/s of the same user (such as an IMSI, a SIP-URL, an IP-address, etc.). Accordingly, for executing a CQ which accomplishes with the received business query of the example above, the DSMS can utilize data of input data streams that report voice calls events in respect to user identifiers other than MSISDNs. There are several techniques that can be used for defining the mapping between both data models. One example (which is illustrated below) comprises representing the data models via XML Schemas, and the mappings via XSLT.

For example, the XML schema of the aforementioned business query data models (i.e. left side of FIG. 5) could be as listed below or similar thereto:

```
<?xml version="1.0"?>
<xsd:schema xmlns:xsd="http://www.w3.org/2001/XMLSchema">
......
    <xsd:complexType name="services">
        <xsd:sequence>
            <xsd:element name="voice" type="xsd:integer"/>
            <xsd:element name="video" type="xsd:integer"/>
            <xsd:element name="messaging"
                type="xsd:integer"/>
        </xsd:sequence>
    </xsd:complexType>
......... .
```

Whereas the XML schema for the lower level data model (i.e. right side of FIG. 5) could be as listed below or similar thereto:

```
<?xml version="1.0"?>
<xsd:schema xmlns:xsd="http://www.w3.org/2001/XMLSchema">
......
    <xsd:complexType name="Circuit switching">
        <xsd:sequence>
            <xsd:element name="voiceCS"
                type="xsd:integer"/>
```

-continued

```
            <xsd:element name="SMS" type="xsd:integer"/>
        </xsd:sequence>
    </xsd:complexType>
    <xsd:complexType name="Packet switching">
        <xsd:sequence>
            <xsd:element name="VoIP"
                type="xsd:integer"/>
            <xsd:element name="Video streaming"
                type="xsd:integer"/>
            <xsd:element name="IPTV"
                type="xsd:integer"/>
        </xsd:sequence>
    </xsd:complexType>
......... .
```

The XSLT, which transforms the data model used by the business queries (i.e. left side of FIG. 5) into the low level data model used by the data sources (i.e. right side of FIG. 5), is illustrated below with reference only to data related to voice calls 831 (i.e. dashed arrows illustrated in FIG. 5) for the sake of clarity. It should be noted that, in the example, the number of voice calls is the sum of the VoIP calls and the voice calls over circuit switched:

```
<?xml version='1.0' ?>
<xsl:stylesheet version="1.0"
xmlns:xsl="http://www.w3.org/1999/XSL/Transform">
    <xsl:template match="/">
......
<voice>
    <xsl:variable name="VoIP" select "/Packet
    switching/VoIP"/>
    <xsl:variable name="voiceCS" select "/Circuit
    switching/voiceCS"/>
    <xsl:variable name="Total-number-of-voice-calls" select
    "$VoIP + $voiceCS"/>
    <xsl:value-of select="$Total-number-of-voice-calls"/>
</voice>
...... .
```

It should be noted that one high level data that can be specified in a business query can be mapped onto several low-level data for making up the CQ which will operate within the DSMS for accomplishing with said business query. More complex relations are also possible (e.g. using regular expressions). The information for mapping: the say "high-level" information that can be specified in a business query provisioned into the DSMS, to the corresponding— say—"low-level" data received in the DSMS from one or more plurality of data sources (which will be used then by the DSMS to generate one or more CQs to serve the business query); can be stored within the DSMS (e.g. held by the "Overall Network Data Schema" storage 116, described below).

In the following, the low-level data model will be described as a possible overall network data model schema. The overall network data schema storage 116 in FIG. 4 represents a data storage storing information about data models of every particular data model schema as exposed by any individual node type as well as their hierarchical dependencies. In this way, the data schema held by a particular reporting telecom node can match at least a subset of the overall data model held by the overall network data schema module held by the DSMS. It is noted that, in case there may be several event reporting schemas valid for the same node, the "subset" might be understood as the union of several subsets.

In the following, a business query handling will be described. Once a business query is received, the "high-level" data requested therein are mapped onto the corresponding "low-level" ones (see the above section on the business query data model), and it is generated by the DSMS one or more CQ candidates that can be executed based on data received by the DSMS via one or more input data streams, which can be used to produce one or more output data streams that fulfill with said business query. As referred earlier, these input data streams can be received in the DSMS coming from one or more data sources, which can be nodes of a telecom network. For example, depending on the nodes' availability information available to the DSMS, it is possible to find out the best option, at a given moment, when coming e.g. to create one or more candidate CQ, and/or to select one CQ for execution among various candidate CQ. If the node conditions change over time, the query is re-assessed by the DSMS. The general logic, which is implemented in the business query handling module in FIG. 4, depends, among other factors, on the data requested.

Depending on the ("high-level") data indicated by a received business query, two cases are detailed in the following sections:

In a first case, it is determined by the DSMS that the ("high-level") data expressed by the business query implies processing within the DSMS via CQ execution of ("low-level") data from input data streams received within the DSMS coming from a particular kind of data sources; and, thus, that said "high-level" data indicated by the business query cannot be—say—indirectly inferred from input data streams received by other kind of data sources (e.g.: only from gateways routing media of users, only from home subscriber servers, etc).

In a second case, the ("low-level") data that coming from input data streams to the DSMS should be processed so as to accomplish with a received business query and, in particular, with the ("high-level") data expressed therein, are determined that can imply processing by the DSMS data from input data stream(s) received from data sources of different kind; and, thus, that can be indirectly inferred from input data streams received by different kind of data sources (e.g. from gateways routing media from users, or also from home subscriber servers).

Decisions in this respect can be accomplished within the DSMS by the business query handling module 115 by checking the mapping information stored in the overall network data schema storage 116, and cooperating with the CQ execution module 113, which sets up the query plans for accomplishing with a CQ to be executed by the DSMS based on data received therein via input data streams.

Apart of the details recited above for determining the input data streams that should be considered by the CQs generated based on a received business query (i.e. interactions between: the business query handling module 115, the overall network data schema storage 116, the CQ execution module 113, which can also imply interactions with the node capabilities module 112), the business query handling module 115 can cooperate with the CQ execution module 113 so as to select an alternative candidate CQ for accomplishing with a received business query depending on the DSMS performance. Details of this are further described below in the section on CQ execution performance assessment.

In the following, business logic requesting data that cannot be indirectly inferred will be described. In such cases it is not possible to use other nodes than the one(s) explicitly reporting "low-level" data that match the type of ("high-level") information requested by the business query. For example, if the query requests to report the top ten URL visited by a set of mobile users within a predefined time window, it can be necessary to process by the DSMS the data of the corresponding input data stream/s conveying this very type of information. Clearly, in this case, and due to the huge number of different URL visited by the mobile users, it can be impossible to infer this information from higher level data such as the type of protocol being used (e.g. http).

It is noted that, as long as the number of distinct values is relatively small, it is possible to estimate the quantitative relations between the higher level data and the corresponding values of the lower level data. But when the number of distinct values is so overwhelmingly high, as in the aforementioned example, it may be difficult to estimate them without disturbing the system performance in a significant way.

This means that, from the pool of available nodes that report data via input data streams to the DSMS, only some of them will be selected by the DSMS in order to extract the desired information which shall be processed by the query plan of the corresponding CQ to be executed for accomplishing with the received business query (e.g., taking into consideration the "top ten URL" example above, input data streams coming from gateway nodes—such as GGSN nodes, which route data packets originated/terminated by user terminals, and which have shallow or deep packet inspection capabilities so as to detect a URL conveyed in a data packet). This selection can consider:

Their availability. Preferably, nodes with more room for event reporting tasks will be selected first.

The resources available in the DSMS. Based on previous experience it is possible to assess the CPU and memory resources needed for handling any input data stream.

The QoS figures specified in the business query. If the stated accuracy is, e.g. 90%, then among all the users accessing the web it can suffice to monitor only a statistically significant subset securing the QoS requirements: it might not be necessary to retrieve reports from every HSS deployed in the network, with one or two HSS being possibly enough.

It is noted that the size of this statistically significant subset may be either statically configured or it may be inferred based on the number of users actually handled by the network. This information may be fetched from the corresponding nodes. Moreover the user distribution among the different nodes may also be statically configured or it can be supposed that users are evenly distributed. As an example, if there are 2,000 users and 2 HSS it can be assumed that there will be 1,000 users per HSS. If the QoS tied to the business query is 90% it would be possible to select only one HSS.

Moreover, the window size used by the corresponding CQ that are to be executed by the DSMS for serving the received business query can also be optimized (i.e. it is not necessary to store every data coming from the input data stream/s in order to properly answer the business query). Sampling methods can be used for this purpose.

It is noted that the same reason proposed for reducing the number of selected reporting nodes can also be used here: if the statistically significant subset is smaller than the number of users actually handled by the node then it may not be necessary to store every report coming from any user. Therefore, a sampling mechanism (that is a mechanism consisting of selecting randomly a subset of the received data—the rest being discarded) is applicable.

In the following, business queries requesting data that can be indirectly inferred are described. In such cases, other network node types, different from those explicitly reporting "low-level" data that match the type of ("high-level") information requested by the business query, might also be used in order to cope with the query demands.

That being the case, it is possible to take advantage of the overall network data model: as it is preferably structured in a hierarchical way, it is also possible to use higher/lower-level data in order to execute the query within the QoS constraints. These higher/lower level data will likely be reported by other node types.

As an example, the business query can request the number of multimedia sessions (with 80% of accuracy) that take place in a certain telecommunications network within a one hour time window. In the network data model, e.g. as held by the overall network data schema, storage data A is the parent of three data children B, C and D. This means that every instance of data A can be further decomposed into three possible data types (B, C, D). For example, data A can represent multimedia session, irrespectively of its type/nature, whereas B, C and D might represent concrete multimedia services (e.g. voice over IP—VoIP—, video streaming, and IP based television—IPTV). Data A is reported by nodes of type X whereas data B, C and D, are reported by nodes of type Y.

In this case, two options can be taken by the DSMS for setting out the corresponding CQ/s—and the corresponding query plans—for producing output data streams that accomplish with the received business query. First, input data streams that convey data A can be processed directly from the corresponding nodes (e.g. reported by nodes of type X). Secondly, input data streams that convey data B, C or D, reported by node/s of type Y, can be processed and the occurrences can be summed up.

However, there is still another alternative if data B is requested by the business query. Then it is possible to provide an answer (i.e. output data streams produced by the DSMS as a response to the business query) based on executing a CQ by the DSMS taking into account data A (i.e. instead of data B) as long as an occurrence relationship between A and any of its children (i.e. data B, C and D) is known in advance (e.g. 30% B, 50% C, 20% D). In order to figure out these percentages, a sampling mechanism can be implemented: taking samples from node types X and Y would yield to these figures. It is noted that dependencies may also be defined among values of specific data. For example, data A, when A=4, may yield to B=3 (20%), B=9 (30%), C=9 (50%).

More generally, this background process can go through the whole data structure stored in the overall network data scheme in order to find the corresponding percentages. In order to do so, and as commented above, the DSMS preferably receives information about data schemas from the available data sources. The desired percentages can be learnt using e.g. a machine learning algorithm. This should preferably be trained when the impact (i.e. the impact due for executing said learning) in the data sources is acceptable. This task is performed by the inter-level data correlation module 114 depicted in FIG. 4.

It is further noted that the machine learning algorithm may learn how to correlate the values of the higher-level data with those of the lower-level data. In order to do so, it may be trained for a certain time period. In principle, the training phase may be executed at any time, even before the generic reporting system is deployed in the network, provided that the corresponding data is available. However, it may consumes computing resources and therefore, if it is executed while the generic reporting system is already up and running in the network, the execution may be restrained to those periods of time in which the impact in the system performance is below a predetermined threshold.

Moreover, the inter-level data correlation module can preferably check from time to time the validity of the learned model, since it might change over time. In case the estimation degrades below a certain limit, the learning process should preferably start again. Another possibility would be to use a stream mining algorithm. Anyway, for every node belonging to the same type, the considerations presented in section on the CQ execution performance assessment can still be applicable.

Among available options, the one with less impact in the overall network performance can be preferred. In order to accomplish this, for every candidate CQ generated by the DSMS at reception of a business query, it is preferably taken into account the availability status of the data source/s (e.g.: see above) and/or the impact in the DSMS performance for accomplishing with any of the candidate CQs (e.g. see the section a CQ execution performance assessment).

In the following, CQ execution performance assessment will be described. Accomplishing with a CQ consumes hardware resources, both, in the data source (which has to send data streams towards the DSMS) and in the DSMS (which has to execute CQs based on said data streams). These resources can be itemized e.g. in terms of CPU resources, local memory resources, communication resources, etc. Therefore the performance of the involved entities (i.e. data source/s and DSMS) can be affected. The execution of a CQ executed by the DSMS can be monitored e.g. in terms of CPU/memory consumption.

For example, said kind of figures can be monitored within a certain time interval. This information can be used to calculate the impact in the DSMS to execute a certain candidate CQ for accomplishing with a received business query, so that, for example, another (alternative) candidate CQ is decided to be executed instead. This CQ switching decision can be accomplished by a communication from the business query handling module 115 towards the CQ execution module 113, e.g. based on performance CQ figures obtained from the DSMS.

With respect to data sources, and as commented earlier, it is possible to learn by the DSMS and on a per data source basis the relation between the event reporting activity carried out by said data source for reporting some data to the DSMS, and the data source's resources consumption, since the data source resources availability can be continuously monitored by the DSMS. In other words, characteristics of a CQ executed by a DSMS (e.g. details on what input data streams are used, and/or the corresponding query plan) are adapted by the DSMS based on availability information collected by the DSMS from the data source/s. These monitoring tasks can be performed by the monitoring performance impact module 117 depicted in FIG. 4. The result of these monitoring tasks can be used by the Query Handling module 115 in order to come up with an optimal plan for deciding which CQ, among a set of candidates CQs, is to be executed for accomplishing with a received business query.

In the following, an implementation example will be explained. Based on the business query example presented above, it is now possible to illustrate the overall procedure:

The business query requests the total number of calls placed by a specific group of users within a predefined time window (20:00-21:00). In the low level data model, this number happens to be the addition of the number of voice calls placed with circuit switching technologies plus the number of voice calls placed with packet switching technologies. According to this, the first CQ candidate (CQ1)

would just consists of a query which reads the input data streams coming from MSC(s) and from CSCF(s) and which adds both values, as long as the received user identifiers belongs to the specified range. However, the VoIP figure can also be indirectly inferred as long as the correlations between the packet switching core leaf and its children (VoIP, video streaming and IPTV) are known. This is a consequence of the background mechanism explained in section on business queries requesting data that can be indirectly inferred.

Just for illustration purposes following percentages are assumed: VoIP (70%), video streaming (20%) and IPTV (10%) Based on these figures it would be possible to derive the number of VoIP calls from the number of services requested with packet switching technologies. This information can be obtained from e.g. a telecom node performing deep packet inspection, (DPI). Then another CQ candidate is possible. For example, a second CQ candidate CQ2 would read the number of voice calls from the MSC input stream (like CQ1) but the number of VoIP calls would be obtained from the DPI input stream instead (multiplied by 0.5).

Figure 6:
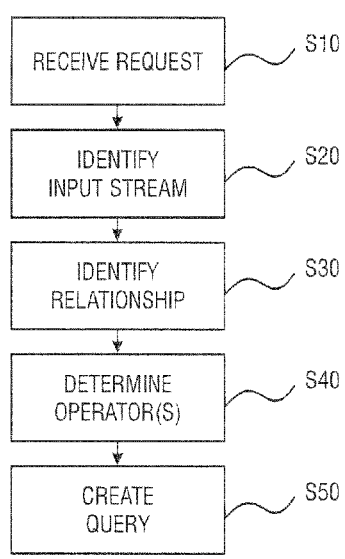
FIG. 6 shows a sequence diagram of a method embodiment of the present invention.

Preferably, depending on the availability of the nodes (CSCF/DPI) and, also, on the estimated impact in the generic reporting system itself, the corresponding CQ candidate will be selected. For instance, a DPI may generate a higher traffic intensity than a CSCF node, resulting in a corresponding performance impact. In case Q2 is selected, and at 20:30 the DPI node becomes overloaded, then it would be possible to store the interim result, execute query Q1 instead (from 20:30 to 21:00), and add the partial figures and send out the final result FIG. 6 shows a sequence diagram of a method embodiment of the present invention. The method serves to provide an output data stream in a network system and comprises the steps of receiving (S10) a request for a desired output data stream, identifying (S20) at least one input data stream on the basis of the desired output data stream, identifying (S30) at least one relationship between the at least one identified input data stream and the desired output data stream, determining (S40) at least one operator on the basis of the at least one identified relationship, and creating (S50) a query for generating an output data stream corresponding to the desired output data stream by applying the at least one operator to the at least one identified input data stream.

Figure 7:
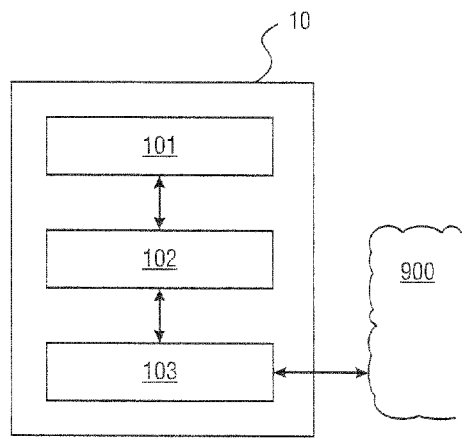
FIG. 7 shows a basic architecture of a processing entity in accordance with the present invention.

FIG. 7 shows an implementation of the processing entity 10. As illustrated, the means of the processing entity 10 may comprise a memory unit 101, a processing unit 102 and a network interface 103, operable to communicate with a network 900 so as to, for example, receive requests for desired output data streams, receive input data streams from one or more data sources in the network and send produced/generated output data streams towards one or more data destinations in the network. In accordance with an embodiment of the invention, the memory unit 101 may store a computer program for providing an output data stream via the network interface 103 to the network 900, wherein execution of the computer program by the processing unit 102 system causes the processing unit 102 to carry out the involved processing for executing the steps of receiving a request for a desired output data stream, identifying at least one input data stream on the basis of the desired output data stream, identifying at least one relationship between the at least one identified input data stream and the desired output data stream, determining at least one operator on the basis of the at least one identified relationship and creating a query for generating an output data stream corresponding to the desired output data stream. The computer program stored by the memory unit 101 can comprise further computer readable instructions that, when executed by the processing unit 102, causes the processing unit to carry out the involved processing for executing the steps for accomplishing also with any of the features described hereinbefore in respect to the processing entity (10, 110).

In summary, one or more of the following advantages can be provided by the invention. It is proposed a generic notification system which dynamically assesses the optimal business query execution in DSMS systems. Based on this, it is possible to provide a generic reporting solution for event reporting/processing in, for example, telecom networks. This is an excellent advantage, since most of current solutions rely on a single-node approach (i.e. only one kind of node send input data streams to the DSMS), and on expert knowledge on the data model held by said node. With the solution described herein it is possible to provide an optimal solution from the whole network point of view.

Further, one or more of the following abbreviations are referred to in the context of the present disclosure CDR=all Detailed Record, DBMS=Data Base Management System, DPI=Deep Packet Inspection, DSMS=Data Stream Management System, FTP=File Transfer Protocol, HSS=Home Subscriber Server, IMS=IP Multimedia Subsystem, IPTV=Television over IP, QoS=Quality of Service, SNMP=Simple Network Management Protocol, VoIP=Voice over IP, XML=Extensible Markup Language, XSLT=Extensible Stylesheet Language Transformations.

Although detailed embodiments have been described, these only serve to provide a better understanding of the invention defined by the independent claims, and are not to be seen as limiting.

The invention claimed is:

1. A method for providing an output data stream in a network system, the method comprising:
    receiving a request for a desired output data stream where the request does not identify at least one input data stream;
    identifying the at least one input data stream on the basis of the desired output data stream;
    identifying at least one relationship between the at least one identified input data stream and the desired output data stream;
    determining at least one operator on a basis of the at least one identified relationship;
    creating a query for generating an output data stream corresponding to the desired output data stream by applying the at least one operator to the at least one identified input data stream;
    the at least one input data stream being identified by referring to a stored mapping between a data information included in the received request and at least one type of data included in a stored data schema, the data schema associating each type of data with at least one input data stream; and
    the at least one relationship being identified by referring to the stored mapping.

2. The method of claim 1, further comprising executing the created query.

3. The method of claim 1, further comprising:
    creating a further query by applying a determined operator to an identified input data stream, the further query differing from said query in at least one of an operator and an input data stream; and
    selecting and executing one of the created queries.

4. The method of claim 3, further comprising:
receiving, from at least one data source providing an identified input data stream, availability information with respect to the availability of an identified input data stream; and
at least one of said creating and said selecting of the query being based on the availability information.

5. The method of claim 3, wherein the received request comprises a Quality of Service (QoS) requirement, and at least one of the creating and selecting of a query is based on the QoS requirement.

6. The method of claim 3, wherein at least one of the creating and selecting of a query is based on processing resources required by the executing of the query.

7. The method of claim 3, wherein, when an input data stream of an executed query is interrupted, another created query is selected and executed.

8. The method of claim 3, wherein one of the query and the further created query is a continuous query which is continuously executed.

9. The method of claim 8, wherein the continuous queries comprise the at least one operator that applies continuously to data received via the at least one input data stream, so as to produce the output data stream.

10. The method of claim 3, wherein one of the query and the further created query is to be executed by a Data Stream Management System, DSMS, of the network system, and wherein the DSMS receives the at least one input data stream and generates the output data stream.

11. The method claim 1, wherein the stored mapping defines a function for generating the output data stream corresponding to the desired output data stream on the basis of at least one type of data included in the stored data schema.

12. The method of claim 1, wherein the stored data schema further defines dependencies between different types of data, and the at least one relationship is identified by further referring to at least one dependency between stored types of data.

13. The method of claim 12, wherein the dependencies between the different types of data are continuously updated on the basis of a detected correlation between input data streams associated with the different types of data.

14. The method of claim 12, wherein a dependency between different types of data comprises a ratio between numeric values of respective data elements of input data streams associated with the different types of data.

15. A processing entity for providing an output data stream in a network system, the entity including a processing unit and memory unit, the processing unit being configured to:
receive a request for a desired output data stream where the request does not identify at least one input data stream;
identify the at least one input data stream on the basis of the desired output data stream;
identify at least one relationship between the at least one identified input data stream and the desired output data stream;
determine at least one operator on a basis of the at least one identified relationship;
create a query for generating an output data stream corresponding to the desired output data stream by applying the at least one operator to the at least one identified input data stream;
the at least one input data stream being identified by referring to a stored mapping between a data information included in the received request and at least one type of data included in a stored data schema, the data schema associating each type of data with at least one input data stream; and
the at least one relationship being identified by referring to the stored mapping.

16. The processing entity of claim 15, wherein the processing unit is further configured to execute the created query.

17. The processing entity of claim 15, wherein the processing entity is a Data Stream Management System, DSMS, server.

18. A computer program for providing an output data stream in a network system, execution of the computer program by at least one processor of a computer system causes the at least one processor to:
receive a request for a desired output data stream where the request does not identify at least one input stream;
identify the at least one input data stream on the basis of the desired output data stream;
identify at least one relationship between the at least one identified input data stream and the desired output data stream;
determine at least one operator on a basis of the at least one identified relationship;
create a query for generating an output data stream corresponding to the desired output data stream by applying the at least one operator to the at least one identified input data stream;
the at least one input data stream being identified by referring to a stored mapping between a data information included in the received request and at least one type of data included in a stored data schema, the data schema associating each type of data with at least one input data stream; and
the at least one relationship being identified by referring to the stored mapping.

19. A non-transitory computer readable medium containing a computer program, which when executed by at least one processor, causes the at least one processor to:
receive a request for a desired output data stream where the request does not identify at least one input stream;
identify the at least one input data stream on the basis of the desired output data stream;
identify at least one relationship between the at least one identified input data stream and the desired output data stream;
determine at least one operator on a basis of the at least one identified relationship;
create a query for generating an output data stream corresponding to the desired output data stream by applying the at least one operator to the at least one identified input data stream;
the at least one input data stream being identified by referring to a stored mapping between a data information included in the received request and at least one type of data included in a stored data schema, the data schema associating each type of data with at least one input data stream; and
the at least one relationship being identified by referring to the stored mapping.

* * * * *